United States Patent [19]

Shue, Jr. et al.

[11] 4,165,673
[45] Aug. 28, 1979

[54] METAL STAMPED AND FORMED SCREW

[75] Inventors: John I. Shue, Jr., York; George H. Douty, Mifflintown, both of Pa.

[73] Assignee: AMP Incorporated, Harrisburg, Pa.

[21] Appl. No.: 892,613

[22] Filed: Apr. 3, 1978

[51] Int. Cl.² .................. F16B 27/00; F16B 33/02
[52] U.S. Cl. ................................. 85/44; 85/11; 85/18; 85/47; 151/37
[58] Field of Search ............... 85/1 L, 11, 18, 41, 85/44, 47, 88; 151/37; 227/136

[56] References Cited

U.S. PATENT DOCUMENTS

| | | | |
|---|---|---|---|
| 630,428 | 8/1899 | Wahlert | 85/41 |
| 1,523,494 | 1/1925 | Sibley | 85/170 X |
| 1,655,808 | 1/1928 | Bodkin | 85/88 |
| 2,279,401 | 4/1942 | Hutchinson | 85/41 |
| 2,549,393 | 4/1951 | Siesel | 85/47 X |
| 3,099,184 | 7/1963 | McCauley | 85/47 X |
| 3,211,352 | 10/1965 | Anstett | 227/136 |
| 3,343,443 | 9/1967 | Moore | 151/37 X |
| 3,554,246 | 1/1971 | Halsted | 227/136 X |
| 3,857,349 | 12/1974 | Pritulsky | 85/1 L X |
| 4,060,020 | 11/1977 | Poliak | 85/1 L |

FOREIGN PATENT DOCUMENTS

| | | | |
|---|---|---|---|
| 806269 | 9/1937 | France | 85/17 |
| 526692 | 5/1955 | Italy | 151/37 |

*Primary Examiner*—Thomas J. Holke
*Attorney, Agent, or Firm*—Russell J. Egan

[57] ABSTRACT

An improved metal stamped and formed screw is disclosed. The subject screw is stamped and formed from continuous web of metal stock to form a plurality of screws joined by a carrier strip. The thus formed strip of screws can be machine applied to prebored holes and manually withdrawn therefrom and reapplied by conventional means.

6 Claims, 6 Drawing Figures

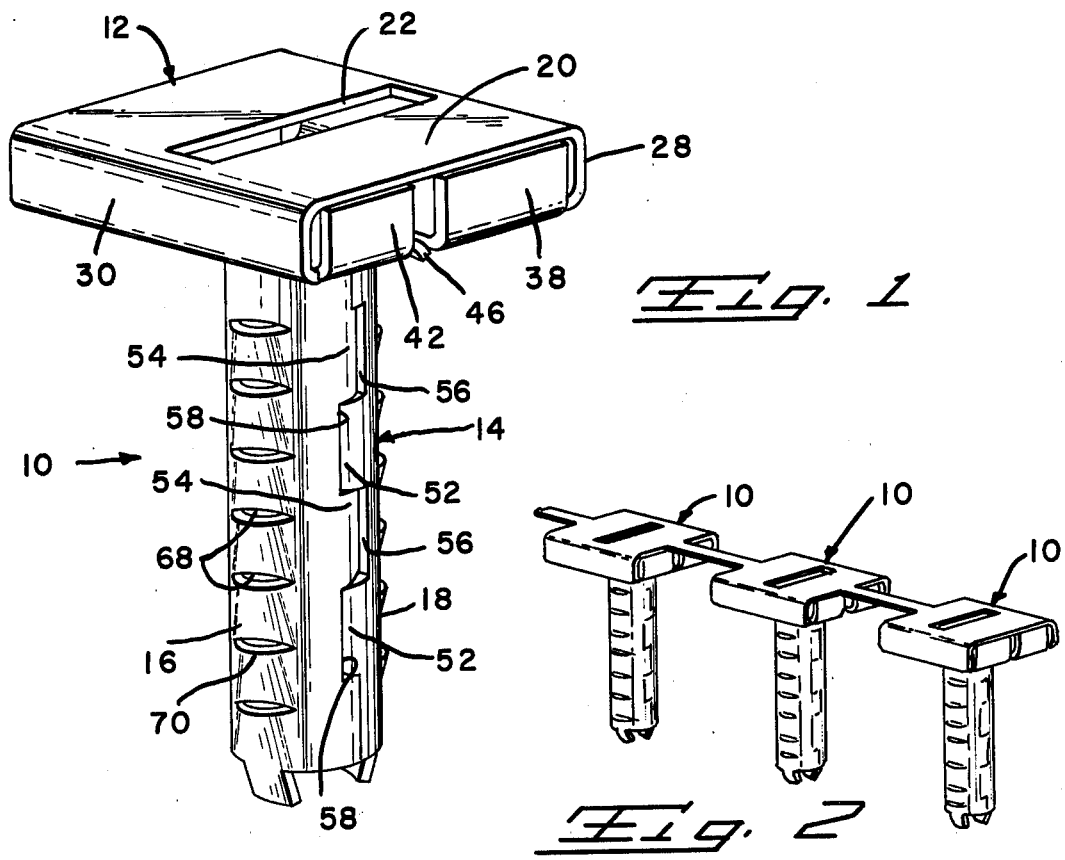
Fig. 1
Fig. 2
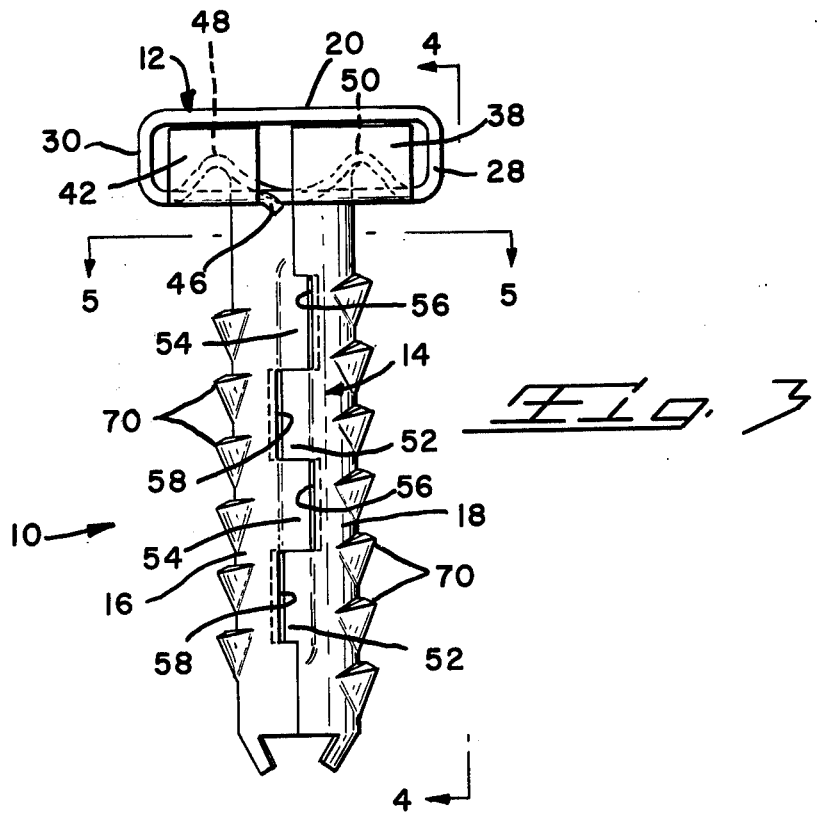
Fig. 3

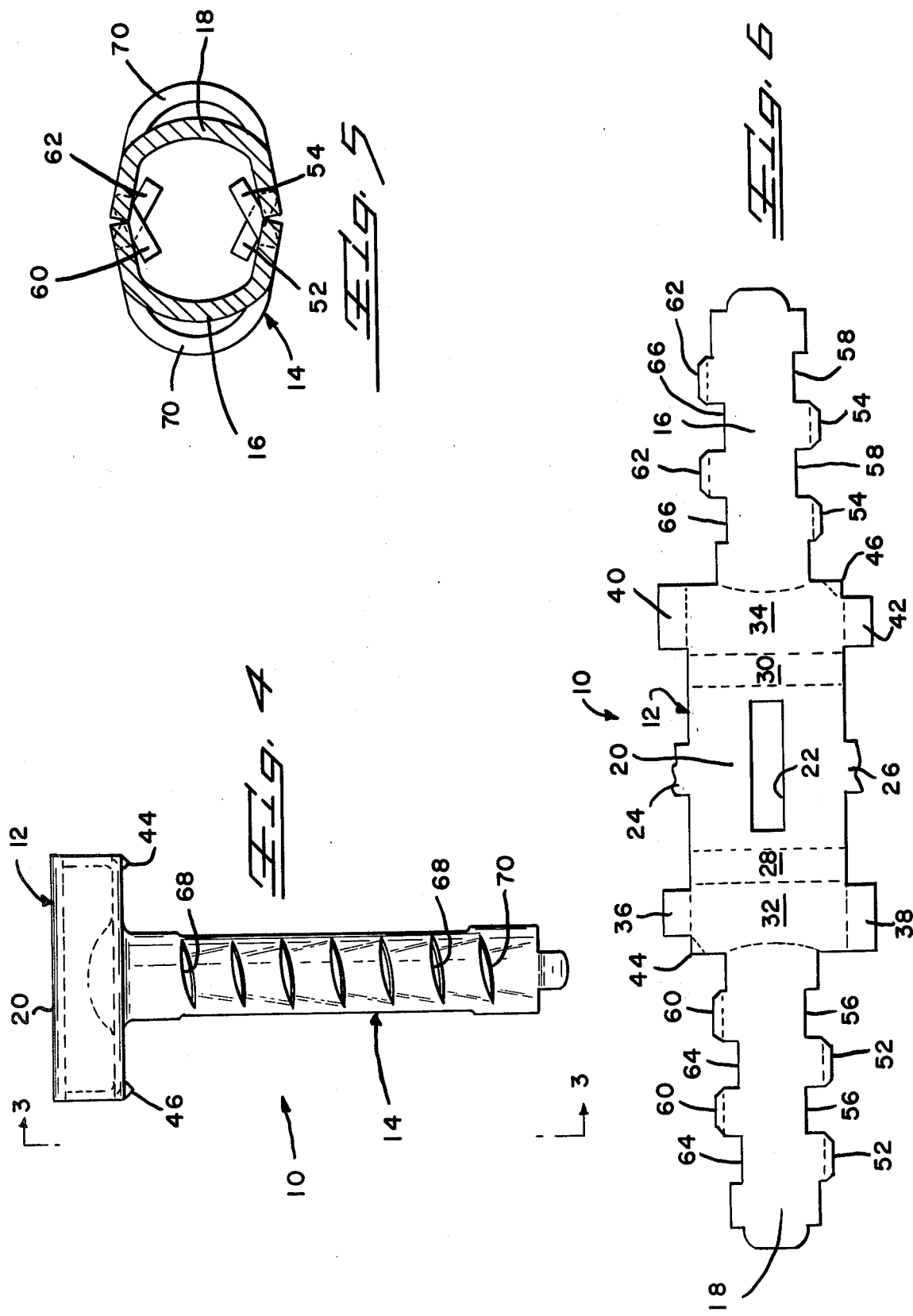

METAL STAMPED AND FORMED SCREW

BACKGROUND OF THE INVENTION

1. The Field Of The Invention

The present invention relates to an improved strip form screw and in particular to a strip of screws stamped and formed from a continuous web of metal stock.

2. The Prior Art

The conventional method of assembly utilizing a plurality of loose piece fasteners is both slow and costly since the operators must handle each individual fastener. Some improvement in speed and reduction in cost can be achieved by providing the fasteners in strip form in an applicator tool. A conventional stapler is an illustration of fasteners in cartridge form loaded in a manual applicator tool. Many times though, it is unsatisfactory to use staples, nails and the like since the assembled part must have the ability of being disassembled for repair and/or replacement.

It has been known that fasteners, such as screws and the like, can be formed in strip form for machine assembly. An example of such a strip form of screw is shown in U.S. Pat. No. 2,279,401. However, the strip of screws shown in this patent is apparently molded in a nose to tail form and thus would be very expensive to produce. It would also have the disadvantage of being rather limited in length and therefore be suitable only for operations in which frequent reloading of the applicator tool would not be a handicap. Somewhat of an improvement is shown in U.S. Pat. Nos. 3,211,352 and 3,554,246 in which a plurality of fasting devices, nails and screws, respectively, are strip fed into a machine for application. The nails and screws are held in rather expensive carrier strips which are removed from the fastener as it is applied. This causes problems in initially forming the strip of fasteners.

SUMMARY OF THE INVENTION

The present invention is directed to a method for forming a continuous strip of screws and the resulting product. The subject screw is stamped and formed from a continuous web of metal stock material and includes a slotted driving head portion and a pair of integral leg portions which together form a threaded shank for the screw. The individual screws are stamped and formed from metal stock with a carrier strip interconnecting the head portions of adjacent screws. The carrier strip is removed from the screws by an applicator tool. The screws have an external thread configuration on the shank portion so designed that the screws can be directly driven into a prebored hole and yet be threadedly removed and reapplied to the hole.

It is therefore an object of the present invention to produce an improved stamped and formed screw which is continuously formed from a web of metal stock with the individual screws being interconnected by an intermediate carrier strip.

It is a further object of the present invention to produce a metal stamped and formed screw which is in a continuous strip and is adapted for machine application without losing the ability for manual threaded withdrawal and replacement.

It is yet another object of the present invention to teach a method for stamping and forming a strip of a plurality of screws from a continuous web of metal stock material.

It is a further object of the present invention to produce a metal stamped and formed screw which can be readily and economically manufactured.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 1 is a perspective view of a single metal screw stamped and formed according to the present invention;

FIG. 2 is a perspective view of a strip of metal screws stamped and formed according to the present invention;

FIG. 3 is a side elevation, taken along line 3—3 of FIG. 4, of a single metal screw stamped and formed according to the present invention;

FIG. 4 is a side elevation, taken along line 4—4 of FIG. 3, of a metal screw stamped and formed according to the present invention;

FIG. 5 is a horizontal transverse section taken along line 5—5 of FIG. 3; and

FIG. 6 is a plan view of the blank for forming the subject screw.

DETAILED DESCRIPTION OF THE PREFERRED EMBODIMENT

The subject screw 10 includes a driving head portion 12 and an integral threaded shank 14 formed by a pair of mating leg portions 16, 18. The driving head 12 has a substantially square top plate 20 with a slot 22 therein and carrier strips 24, 26 extending from an opposite first pair of sides. Sidewalls 28, 30 are integral with surface 20 and extend from an opposite second pair of sides. Under plates 32, 34 extend from sidewalls 28, 30, respectively, back under top plate 20 and include tabs 36, 38, 40 and 42 which are upturned so that their free ends lie adjacent the bottom of plate 20 and serve to support plate 20. Points 44, 46 of tabs 36, 42, respectively, are downturned, as best noted from FIG. 3, and serve to lock the screw against unintended loosening, such as by vibration. FIG. 3 also shows how under plates 32, 34 are deformed to accommodate the rounding of the leg portions 16, 18. This deformation also serves the purpose of forming elevated abutments 48, 50 which underlie slot 22 and serve to stop a blade of a screwdriver from going too far into the head thereby limiting the torque that can be applied to the screw. The leg portions 16, 18 each have an essentially elongated profile with a series of projecting tabs 52, 54 and recesses 56, 58 on a first long side and like tabs 60, 62 and recesses 64, 66 on the opposite long side. Each tab 52, 54, 60, 62 is matched on the opposite side of the leg portion with a recess 64, 66, 56, 58, respectively. When the screw is formed, tabs 52, 54, 60, 62 are received in recesses 58, 56, 66, 64, respectively in the opposite leg portion for intermating engagement, as best shown in the section view of FIG. 5. Each leg portion 16, 18 is further provided with a plurality of inclined parallel slots 68. Like sides of each slot are formed into a series of protrusions which form an interrupted external thread on the finished screw.

The subject screw is formed by first stamping out the blank shown in FIG. 6. The blank is then passed through a series of dies which form the slots 68 and protrusions 70 and then sequentially form the head 12 and bring the leg portions 16, 18 into the interlocking configuration, as shown in FIGS. 1 through 5. It will be noted from FIG. 5 that the tabs 52, 54, 60, 62 extend into the opposite aligned recesses 58, 56, 66, 64 and secure the leg portions together.

The subject screw is preferably formed in strip fashion as shown and thus is quite suitable for machine application. The strip of screws can be fed into an applicator machine, cut from the carrier strip, and driven straight into prebored holes in the member to be secured, which preferably is formed of a high impact plastics material such as commonly used as in telephones, radios, toys, automobiles, and the like. The tapered threads on the leg portions allow the screws to be driven directly into the holes at very high speed insertion rates without any rotational movement of the screw being required. Removal and reinsertion of the screws is facilitated by application of an ordinary screwdriver to the slot 22 or a wrench, nut driver, or the like to the outer profile of the square head. The screws thus can be inserted rapidly and automatically and withdrawn manually without derogatory effect upon either the screw or the member receiving the screw. The subject screws can be reinserted into the bored holes by normal threaded rotation or by a straight diving action.

The present invention may be subject to many modifications and changes without departing from the spirit or essential characteristics thereof. The present embodiment is therefore to be considered in all respects as illustrative and not restrictive of the scope of the invention.

What is claimed is:

1. A screw stamped and formed from a continuous web of material, said screw comprising:
   a head portion having a top plate with a slot therein, a pair of integral sidewalls depending from opposite sides of said top plate and defining an external profile, each said slot and said profile being adapted to receive associated tooling for imparting rotary movement to said screw, a pair of bottom plates integrally extending from said sidewalls underneath said top plate, and at least one tab intermediate said bottom plates and said top plate providing support therefor; and
   a shank portion formed by a pair of elongated leg portions integrally depending from adjacent edges of said bottom plates and interengaging along their longitudinal edges to form said shank portion, each said leg portion having a plurality of inclined parallel slots, and an outwardly directed protrusion adjacent one like side of each said slot forming an interrupted screw thread on the external surface of said shank portion.

2. A screw according to claim 1 further comprising:
   carrier strip means attached to said head portion and joining a plurality of said screws into a strip, said carrier strip means being removed prior to application of a screw.

3. A screw according to claim 1 further comprising:
   a series of projections and recesses along the longitudinal edges of said leg portions, each projection being matched with a recess on the opposite side of the same leg portion and the adjacent edge of the opposite leg portion, said projections interengaging with said recesses in the finished screw.

4. A screw according to claim 1 further comprising:
   at least one downturned point on at least one of said bottom plates, said point serving the function of a lock washer.

5. The screw according to claim 1 further comprising:
   upwardly directed protrusions in said bottom plates underlying said slot and serving as abutments limiting penetration of tooling into said slot.

6. The screw according to claim 1 wherein said interrupted screw thread allows direct drive application of said screw to prebored holes and rotational removal of said screw from said hole.

* * * * *